US 011889143B2

(12) United States Patent
Wang et al.

(10) Patent No.: US 11,889,143 B2
(45) Date of Patent: Jan. 30, 2024

(54) VIDEO FILE PROCESSING METHOD AND APPARATUS, ELECTRONIC DEVICE, AND COMPUTER STORAGE MEDIUM

(71) Applicant: Beijing Zitiao Network Technology Co., Ltd., Beijing (CN)

(72) Inventors: Xingyi Wang, Beijing (CN); Jiajia Fan, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/887,138

(22) Filed: Aug. 12, 2022

(65) Prior Publication Data

US 2022/0394319 A1    Dec. 8, 2022

Related U.S. Application Data

(63) Continuation of application No. PCT/CN2021/115733, filed on Aug. 31, 2021.

(30) Foreign Application Priority Data

Sep. 9, 2020  (CN) .......................... 202010943738.7

(51) Int. Cl.
*H04N 21/431* (2011.01)
*G06F 16/783* (2019.01)
(Continued)

(52) U.S. Cl.
CPC ....... *H04N 21/431* (2013.01); *G06F 16/7837* (2019.01); *H04N 21/234* (2013.01); *H04N 21/475* (2013.01)

(58) Field of Classification Search
CPC .. H04N 21/431; H04N 21/234; H04N 21/475; G06F 16/7837
See application file for complete search history.

(56) References Cited

U.S. PATENT DOCUMENTS

| 10,063,910 | B1  | 8/2018 | Yelton et al. |
| 2013/0254816 | A1 | 9/2013 | Kennedy et al. |
| 2021/0168473 | A1* | 6/2021 | Li .......................... G11B 27/34 |

FOREIGN PATENT DOCUMENTS

| CN | 103873945 A | 6/2014 |
| CN | 104581409 A | 4/2015 |

(Continued)

OTHER PUBLICATIONS

International Patent Application No. PCT/CN2021/115733; Int'l Search Report; dated Nov. 18, 2021; 3 pages.

(Continued)

*Primary Examiner* — Sumaiya A Chowdhury
(74) *Attorney, Agent, or Firm* — BakerHostetler

(57) ABSTRACT

The present invention provides a video file processing method and apparatus, an electronic device, and a computer readable storage medium, relating to the field of video processing. The method comprises: in a preset first editing interface for an original video file, when a trigger instruction for a preset first interaction function is received, displaying a preset second editing interface, the second editing interface comprising a preset interaction label; receiving, in the interaction label, first identification information, which is determined by an editor, of an interaction object to obtain an interaction label comprising the first identification information; and when an editing completion instruction initiated by the editor is received, generating a target video file comprising the interaction label, and publishing the target video file.

7 Claims, 16 Drawing Sheets

(51) Int. Cl.
*H04N 21/234* (2011.01)
*H04N 21/475* (2011.01)

(56) References Cited

FOREIGN PATENT DOCUMENTS

| | | |
|---|---|---|
| CN | 105847913 A | 8/2016 |
| CN | 106446056 A | 2/2017 |
| CN | 107484019 A | 12/2017 |
| CN | 108289057 A | 7/2018 |
| CN | 110049266 A | 7/2019 |
| CN | 110378247 A | 10/2019 |
| CN | 110460578 A | 11/2019 |
| CN | 110868639 A | 3/2020 |
| CN | 111325004 A | 6/2020 |
| CN | 111523053 A | 8/2020 |
| CN | 111580724 A | 8/2020 |
| CN | 112040330 A | 12/2020 |
| JP | 2016-525727 A | 8/2016 |
| WO | WO 2014/194020 A1 | 12/2014 |

OTHER PUBLICATIONS

European Patent Application No. 21865893.8; Extended Search Report; dated Apr. 21, 2023; 9 pages.

\* cited by examiner

VIDEO FILE PROCESSING METHOD AND APPARATUS, ELECTRONIC DEVICE, AND COMPUTER STORAGE MEDIUM

The present application is a continuation of International Patent Application No. PCT/CN2021/115733, titled "VIDEO FILE PROCESSING METHOD AND APPARATUS, ELECTRONIC DEVICE, AND COMPUTER STORAGE MEDIUM", filed on Aug. 31, 2021, which claims priority to Chinese Patent Application No. 202010943738.7, titled "VIDEO FILE PROCESSING METHOD AND APPARATUS, ELECTRONIC DEVICE, AND COMPUTER STORAGE MEDIUM", filed on Sep. 9, 2020 with the National Intellectual Property Administration, PRC, both of which are incorporated herein by reference in their entireties.

FIELD

The present disclosure relates to the field of video processing, and in particular to a video file processing method and apparatus, an electronic device, and a computer-readable storage medium.

BACKGROUND

In daily life, users may watch videos via video applications, and an application is usually provided with a comment area or a message area. In addition to posting comments or messages in the comment area or message area, a user may also interact with another user in a manner of @.

For example, if a user A @ a user B in the comment area and leaves a message to the user B, the system will prompt the user B. The user B may jump to the comment area to view the message according to the prompt. Alternatively, without viewing the comment area, the system pushes the message of the user A to the user B separately.

However, the above interaction method has the following problems:
1) interaction among users needs to be implemented in the comment area, resulting in a poor interaction experience; and
2) no interaction is implemented between users.

Therefore, there is an urgent need for a video processing method to solve the problem of poor interaction experience of users when watching videos.

SUMMARY

This summary section is provided to introduce concepts in a simplified form that are described in detail in the Detailed Description section that follows. This summary section is not intended to identify key features or essential features of the claimed technical solution, nor is it intended to be used to limit the scope of the claimed technical solution.

A video file processing method and apparatus, an electronic device, and a computer-readable storage medium are provided according to the present disclosure, which can solve the problem of poor interaction experience of users when watching videos. The technical solution is described as follows.

In a first aspect, a video file processing method is provided, which includes:

displaying, in a preset first editing interface for an original video file, a preset second editing interface in a case that a trigger instruction for a preset first interaction function is received, where the second editing interface includes a preset interaction label;

receiving, in the preset interaction label, first identification information of an interaction object determined by an editor, to obtain an interaction label including the first identification information; and generating, in a case that an editing completion instruction initiated by the editor is received, a target video file including the interaction label, and releasing the target video file.

In a second aspect, a video file processing apparatus is provided, which includes: a first processing module, a second processing module and a third processing module. The first processing module is configured to display, in a preset first editing interface for an original video file, a preset second editing interface in a case that a trigger instruction for a preset first interaction function is received, where the second editing interface includes a preset interaction label. The second processing module is configured to receive, in the preset interaction label, first identification information of an interaction object determined by an editor, to obtain an interaction label including the first identification information. The third processing module is configured to generate, in a case that an editing completion instruction initiated by the editor is received, a target video file including the interaction label, and releasing the target video file.

In a third aspect, an electronic device is provided, which includes: a processor, a memory and a bus. The bus is configured to connect the processor and the memory. The memory is configured to store operation instructions. The processor is configured to perform, by invoking the operation instructions, the video file processing method according to the first aspect of the present disclosure.

In a fourth aspect, a computer-readable storage medium is provided, which stores computer instructions. The computer instructions, when executed on a computer, enable the computer to perform the video file processing method according to the first aspect of the present disclosure.

With the technical solutions according to the present disclosure, the following beneficial effects can be realized. In a case that a trigger instruction for a preset first interaction function is received, a preset second editing interface is displayed in a preset first editing interface for an original video file, where the second editing interface includes a preset interaction label. First identification information of an interaction object determined by an editor is received in the interaction label, to obtain an interaction label including the first identification information. In a case that an editing completion instruction initiated by the editor is received, a target video file including the interaction label is generated, and the target video file is released. In this way, when the editor edits the video file, the editor may interact with the interaction object in the video file via the interaction label. Compared with the conventional way of interacting in the comment area, the interaction experience of a user between a friend is strengthened, thereby increasing the social penetration and interaction feedback rate among friends.

BRIEF DESCRIPTION OF THE DRAWINGS

The above and other features, advantages and aspects of various embodiments of the present disclosure will become more apparent when taken in conjunction with the drawings and with reference to the following detailed description of embodiments. Throughout the drawings, the same or similar reference numbers refer to the same or similar elements. It should be understood that the drawings are schematic and that the originals and elements are not necessarily drawn to scale.

DETAILED DESCRIPTION OF EMBODIMENTS

Figure 1:
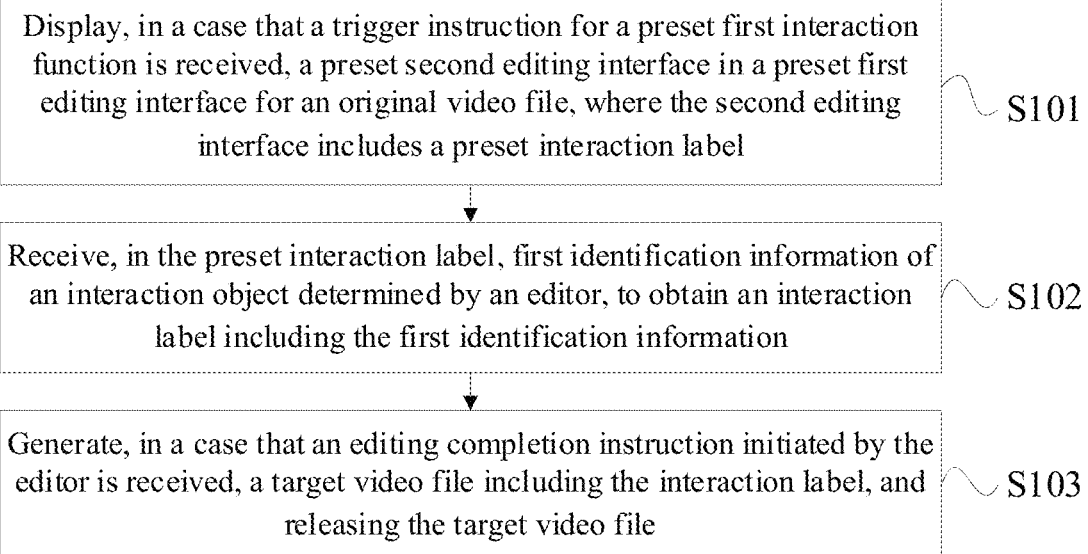
FIG. 1 is a schematic flowchart of a video file processing method according to an embodiment of the present disclosure.

Hereinafter, embodiments of the present disclosure will be described in more detail with reference to the drawings. Although some embodiments of the present disclosure are shown in the drawings, it should be understood that the present disclosure may be implemented in various forms and should not be construed as being limited to the embodiments described herein. Further, the embodiments are provided for a more thorough and complete understanding of the present disclosure. It should be understood that the drawings and embodiments of the present disclosure are only used for exemplary purposes, and are not used to limit the protection scope of the present disclosure.

It should be understood that the various steps in the method embodiments of the present disclosure may be executed in a different order, and/or executed in parallel. In addition, the method embodiments may include additional steps and/or omit the illustrated steps. The scope of the present disclosure is not limited in this respect.

The term "including" and its variants herein are non-inclusive, that is, "including but not limited to". The term "based on" means "based at least partially on". The term "an embodiment" means "at least one embodiment"; the term "another embodiment" means "at least one another embodiment"; the term "some embodiments" means "at least some embodiments." Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence of these devices.

It should be noted that the terms "a" and "a plurality of" mentioned in the present disclosure are illustrative and not restrictive, and those skilled in the art should understand that unless clearly indicated in the context, these terms should be understood as "one or more".

The names of information or messages communicated between multiple devices in the embodiments of the present disclosure are only used for illustrative purposes, and are not used to limit the scope of these messages or information.

The video file processing method and apparatus, the electronic device and the computer-readable storage medium according to the present disclosure are intended to solve the above technical problems in the conventional art.

The technical solutions of the present disclosure and how the technical solutions of the present disclosure solve the above technical problems will be described in detail below with specific embodiments. The following specific embodiments may be combined with each other, and the same or similar concepts or processes may not be repeated in some embodiments. The embodiments of the present disclosure will be described below with reference to the drawings.

In an embodiment, a video file processing method is provided, as shown in FIG. 1, the method includes steps S101 to S103.

In step S101, in a case that a trigger instruction for a preset first interaction function is received, a preset second editing interface is displayed in a preset first editing interface for an original video file. The second editing interface includes a preset interaction label.

In the embodiment of the present disclosure, an application client for playing video files and editing video files is installed in the terminal. Accordingly, the application client is preset with at least one playing interface for playing video files and at least one editing interface for editing video files.

It should be noted that playing video files and editing video files may be performed by the same application client or different application clients, which may be set according to actual needs in practice and is not limited in this embodiment of the present disclosure.

Further, the original video file may be a video file captured by the editor. In practice, the editor may edit the original video file in any editing interface of the application client to obtain the edited video file, and upload the edited video file to the server to share with others. Alternatively, the editor may also upload, without editing, the original video file directly to the server to share with others.

Specifically, the editor opens the preset first editing interface, imports the original video file and edits the original video file. The interaction function may be a "@" function, for example, the editor may @ a friend.

When the application client receives a trigger instruction for the first interaction function, a preset second editing interface may be displayed, where the second editing interface includes a preset interaction label. The editor may edit identification information of an interaction object in the interaction label.

In step S102, first identification information of the interaction object determined by the editor is received in the interaction label, to obtain an interaction label including the first identification information.

In the second editing interface, the editor may determine the first identification information of the interaction object, to obtain the interaction label including the first identification information. For example, when the interaction function is @ a friend, the interaction object corresponding to the first interaction function is a friend B @ by an editor A, and the first identification information is an identity document (identity number, ID) of B, so that an interaction label including the ID of B is obtained. The interaction label may be displayed in the video image when the video file is being played.

In step S103, in a case that an editing completion instruction initiated by the editor is received, a target video file including the interaction label is generated, and the target video file is released.

A virtual button for generating a target video file may be preset in the editing interface. When the editor clicks on the virtual button, the editing completion instruction is triggered, the application client may generate the target video file including the interaction label based on the editing completion instruction and release the target video file.

In the embodiment of the present disclosure, in a case that a trigger instruction for the first interaction function is received, a preset second editing interface is displayed in the preset first editing interface for the original video file, where the second editing interface includes a preset interaction label. The first identification information of the interaction object corresponding to the first interaction function is received in the interaction label, to obtain the interaction label including the first identification information. In a case that the editing completion instruction initiated by the editor is received, the target video file including the interaction label is generated and the target video file is released. In this way, when the editor edits the video file, the editor may interact with the interaction object via the interaction label in the video file. Compared with the conventional way of interacting in the comment area, the interaction experience of a user between a friend is strengthened, thereby increasing the social penetration and interaction feedback rate among friends.

Figure 2:
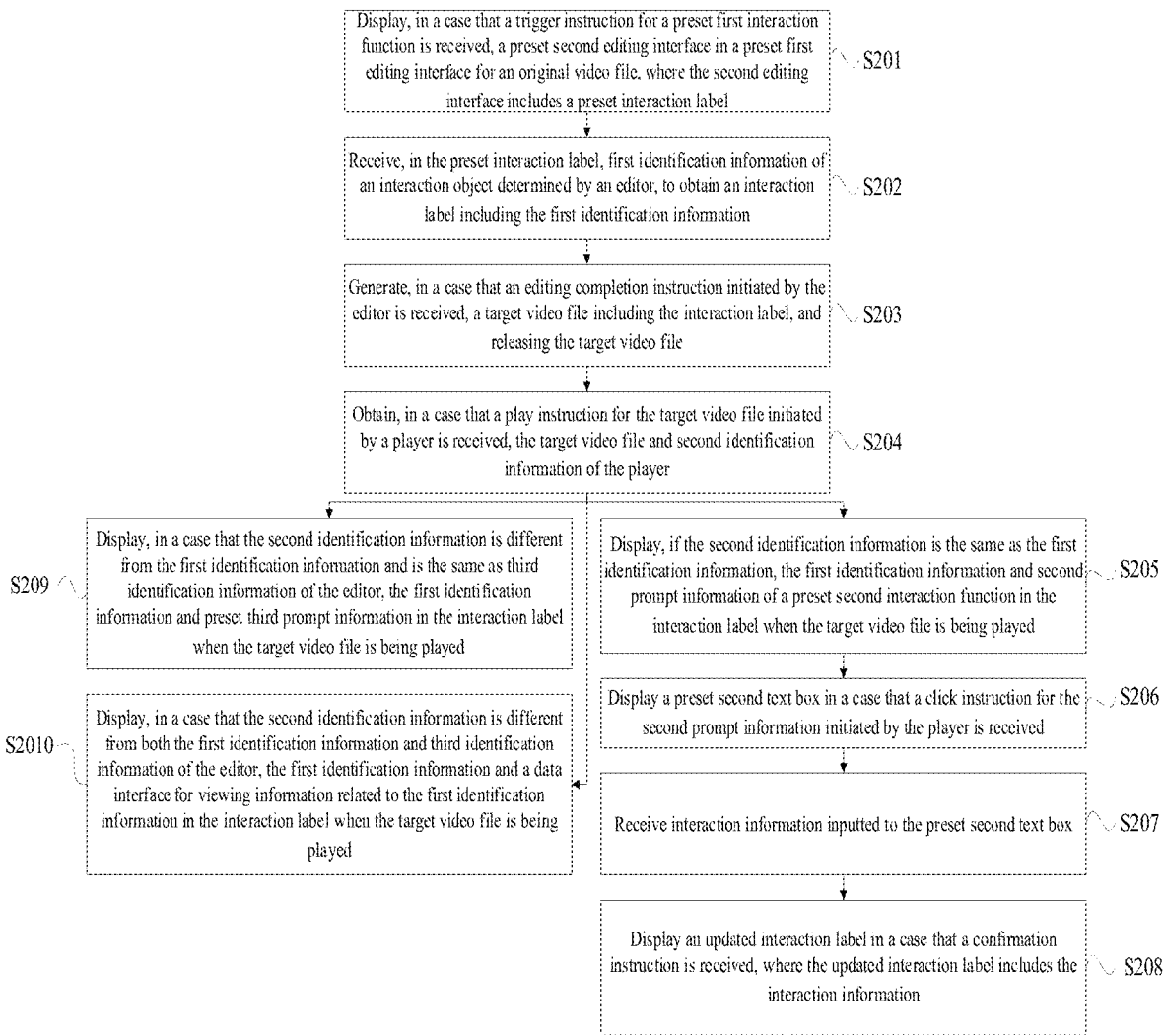
FIG. 2 is a schematic flowchart of a video file processing method according to another embodiment of the present disclosure.

In another embodiment, a video file processing method is provided, as shown in FIG. 2, the method includes steps S201 to S2010.

In step S201, in a case that a trigger instruction for a preset first interaction function is received, a preset second editing interface is displayed in a preset first editing interface for an original video file. The second editing interface includes a preset interaction label.

In the embodiment of the present disclosure, an application client for playing video files and editing video files is installed in the terminal. Accordingly, the application client is preset with at least one playing interface for playing video files and at least one editing interface for editing video files. The terminal may have the following characteristics:

(1) in terms of hardware, the device has a central processing unit, a memory, an input component and an output component, that is, the device is a microcomputer device with a communication function. In addition, the device may also support a variety of input ways, such as keyboard, mouse, touch screen, microphone and camera, and may adjust the input as needed. In addition, the device may also support many output ways, such as receiver, display screen, and may also adjust the output as needed;

(2) in terms of software, the device should have an operating system, such as Windows Mobile, Symbian, Palm, Android, iOS. In addition, these operating systems are becoming more and more open, and personalized applications developed based on these open operating system platforms emerge in an endless stream, such as address books, calendars, notepads, calculators and various games, which can satisfy customized needs of users;

(3) in terms of communication capabilities, the device has flexible access modes and high-bandwidth communication performance, and may automatically select a communication mode according to the selected business and the environment, so as to facilitate the use of users. The device may support global system for mobile communication (GSM), wideband code division multiple access (WCDMA), code division multiple access (CDMA2000), Time Division Synchronous Code Division Multiple Access (TDSCDMA), Wireless-Fidelity, wireless fidelity (Wi-Fi), Global Microwave Access (WiMAX) and the like, so as to adapt to a variety of standard networks. The device not only supports voice services, but also supports a variety of wireless data services; and (4) in terms of use function, the device is implemented by paying more attention to humanization, personalization and multi-function. With the development of computer technology, the device has changed from a "device-centered" mode to a "people-centered" mode, and has integrated technologies, such as embedded computing, control technology, artificial intelligence technology and biometric authentication, which fully reflects the purpose of people-oriented. With the development of software technology, the device may be adjusted according to individual needs, making it more personalized. In addition, the device has integrated many software and hardware, and has powerful functions.

It should be noted that playing video files and editing video files may be performed by the same application client or different application clients, which may be set according to actual needs in practice and is not limited in this embodiment of the present disclosure.

Further, the original video file may be a video file captured by the editor. In practice, the editor may edit the original video file in any editing interface of the application client to obtain the edited video file, and upload the edited video file to the server to share with others. Alternatively, the editor may also upload, without editing, the original video file directly to the server to share with others.

Specifically, the editor opens the preset first editing interface, imports the original video file and edits the original video file. The interaction function may be a "@" function, for example, the editor may @ a friend.

When the editor clicks on a virtual button 302, a trigger instruction for the first interaction function is initiated, and the application client may display the preset second editing interface after receiving the trigger instruction.

In a preferred embodiment of the present disclosure, the trigger instruction is generated in the following way: face recognition on the original video file is performed successfully in the first editing interface; or the editor triggering a virtual button corresponding to the first interaction function in the first editing interface.

Specifically, during the editing process, the application client may perform face recognition on the original video file, and if the face recognition is performed successfully, a trigger instruction may be generated. Alternatively, a virtual button corresponding to the first interaction function is preset in the first editing interface, when the editor clicks on the virtual button, the application client may generate a trigger instruction.

The application client may perform face recognition on the original video file by first playing the original video file and then performing face recognition on the played video image; or the application client may perform face recognition while playing the original video file in the background. However, other methods for performing face recognition on video files are also applicable to the embodiments of the present disclosure, which are not limited in the embodiments of the present disclosure.

Figure 3:
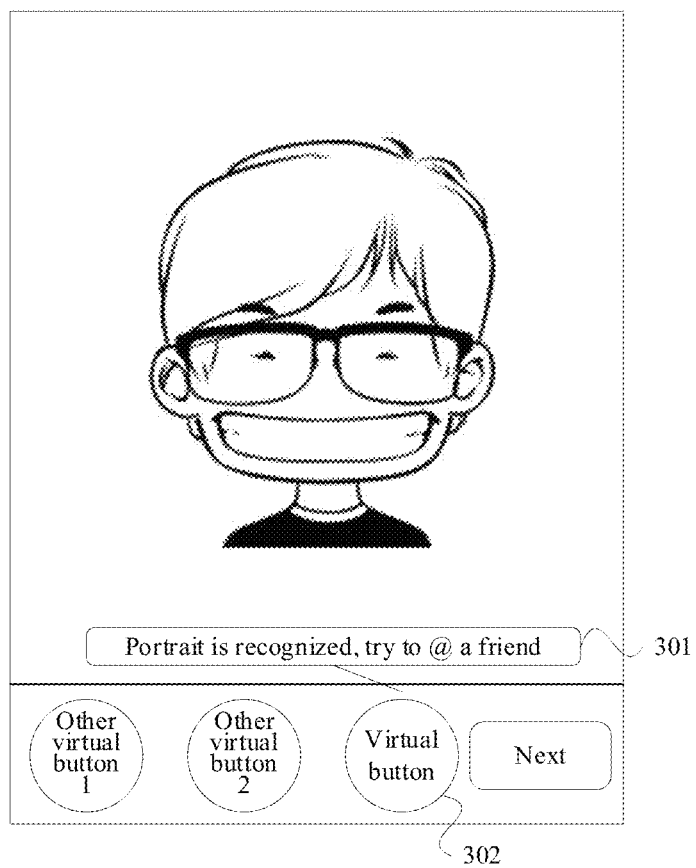
FIG. 3 is a schematic diagram of a first editing interface according to the present disclosure.

For example, the editor edits the original video in the first editing interface as shown in FIG. 3, and the application client recognizes that there is a portrait in the current video image, first prompt information 301 of the first interaction function may be displayed in the first editing interface. The first interaction function may correspond to the virtual button 302 in the first editing interface. However, other virtual buttons may also be preset in the first editing interface, which may be set according to actual needs in practice and is not limited in the embodiments of the present disclosure.

In step S202, the first identification information of the interaction object determined by the editor is received in the interaction label, to obtain an interaction label including the first identification information.

In the second editing interface, the editor may determine the first identification information of the interaction object, to obtain the interaction label including the first identification information. For example, when the interaction function is @ a friend, the interaction object corresponding to the first interaction function is a friend B @ by an editor A, and the first identification information is an identity document (identity number, ID) of B, so that the interaction label including the ID of B is obtained. The interaction label may be displayed in the video image when the video file is being played.

In a preferred embodiment of the present disclosure, the second editing interface includes a preset identification information list, and the identification information list includes identification information of at least one interaction object.

The receiving the first identification information of the interaction object determined by the editor in the preset interaction label, to obtain an interaction label including the first identification information includes:
  receiving a selection instruction for identification information in the identification information list; and
  generating an interaction label including the identification information in a case that a generation instruction for generating an interaction label is received.

Specifically, the second editing interface may include a preset interaction label and a preset identification information list, where the identification information list includes identification information of at least one interaction object. When displaying the second editing interface, the application client may display the preset interaction label and the preset identification information list in the second editing interface. When the editor selects identification information from the identification information list, a selection instruction for the identification information is initiated. After receiving the selection instruction, the application client inputs the identification information corresponding to the selection instruction into the preset interaction label. In a case that the editor determines to generate an interaction label, an interaction label including the identification information is generated.

Figure 4A:
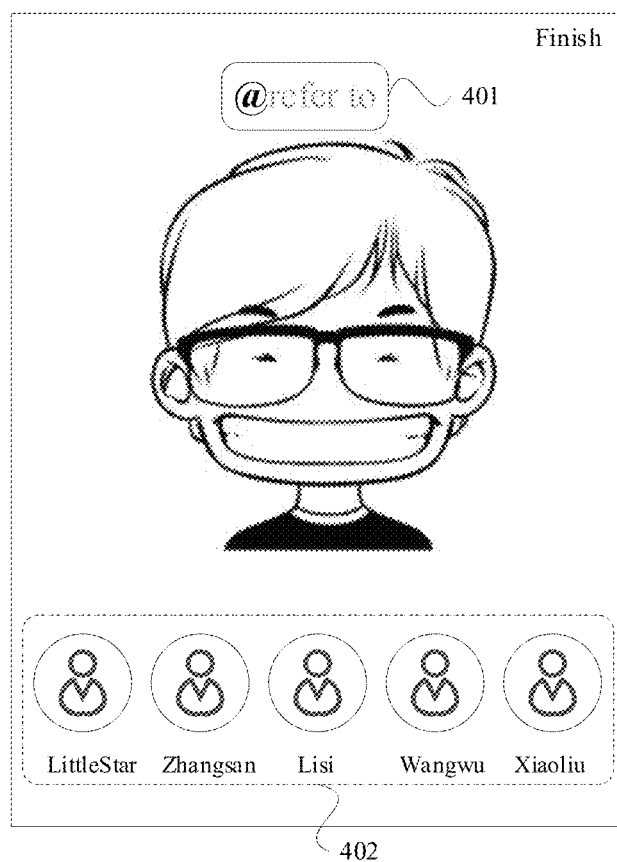
FIG. 4A to 4C are schematic diagrams of interfaces for editing an interaction label in a second editing interface according to the present disclosure.
Figure 4B:
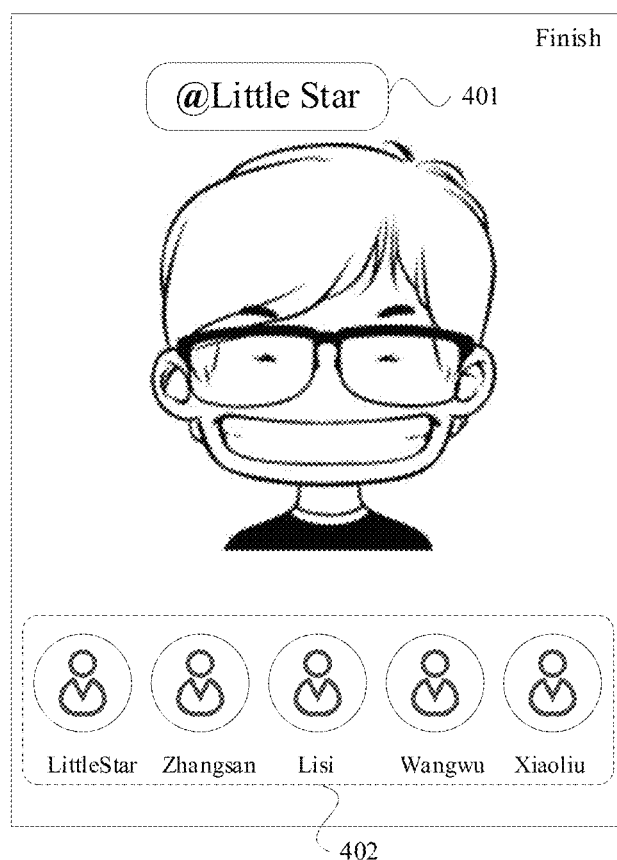
Figure 4C:
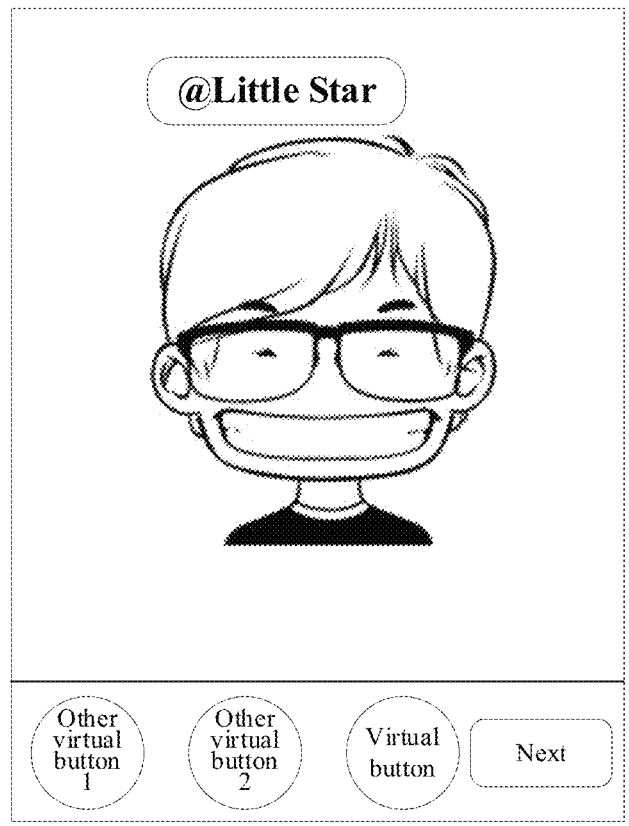

For example, in the second editing interface as shown in FIG. 4A, a preset interaction label 401 and an identification information list 402 are displayed, where the interaction label is preset with an interaction instruction "@" of an interaction function. In a case that the editor selects a "Little Star" in the identification information list, the application client inputs the "Little Star" to the interaction label 401, as shown in FIG. 4B. If the editor clicks on "Finish" on an upper right corner, a generation instruction for generating an interaction label is initiated. After receiving the generation instruction, the application client generates an interaction label including "Little Star", as shown in FIG. 4C.

It should be noted that the identification information list in the second editing interface may be a friend list of the editor, friends recently contacted by the editor, or other types of identification information lists, which may be set as needed, and is not limited in this embodiment of the present disclosure.

Further, after the interaction label is generated, the editor may also change a style of the interaction label. For example, in the interaction label shown in FIG. 4C, when the editor clicks on the interaction label, the style of the interaction label may be changed. However, in practice, the style of the interaction label may also be changed in other ways, which is not limited in this embodiment of the present disclosure.

In a preferred embodiment of the present disclosure, the interaction label includes a preset first text box.

The receiving first identification information of the interaction object determined by the editor in the interaction label, to obtain an interaction label including the first identification information includes:
  receiving identification information inputted to the first text box; and
  generating an interaction label including the inputted identification information in a case that a generation instruction for generating an interaction label is received.

Specifically, the second editing interface may also include a preset first text box. When displaying the second editing interface, the application client may display the preset first text box in the second editing interface. The editor may directly input the instruction "@" of the interaction function and the identification information of the interaction object in the first text box, and then determine to generate an interaction label, so that an interaction label including the identification information can be generated.

Figure 5A:
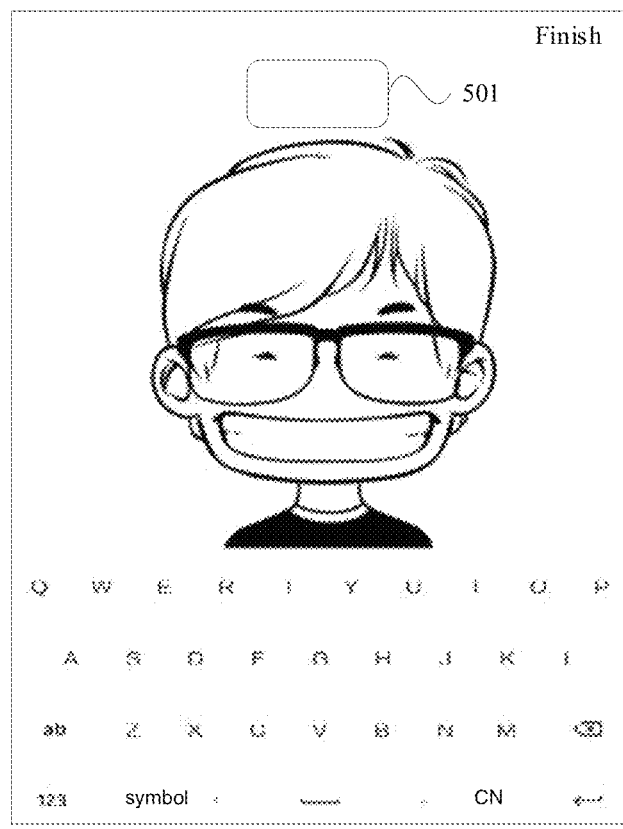
FIG. 5A to 5C are schematic diagrams of interfaces for editing an interaction label in a second editing interface according to the present disclosure.
Figure 5B:
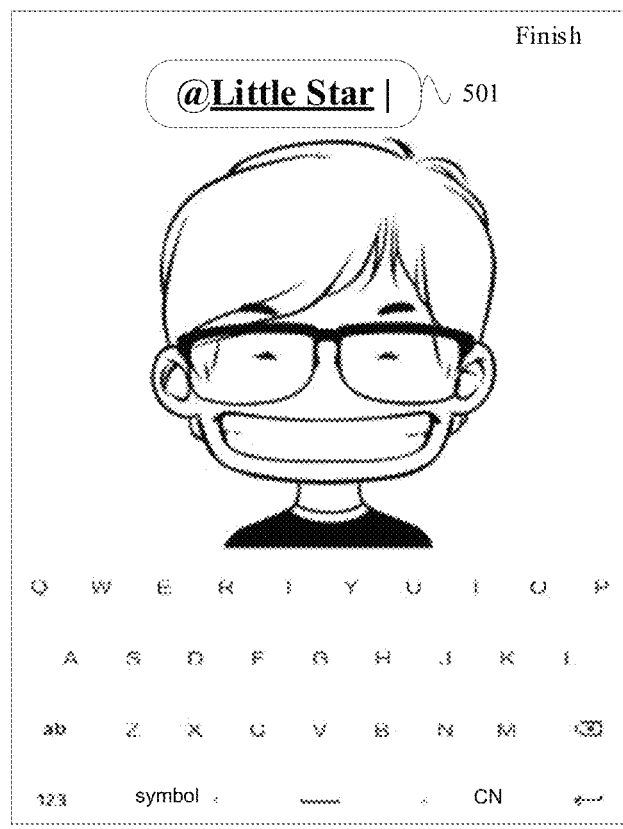

For example, in the second editing interface shown in FIG. 5A, a preset first text box 501 is displayed, and the editor may input "@Little Star" in the first text box, as shown in FIG. 5B. In a case that the editor clicks on "Finish" on the upper right corner, the generation instruction for generating an interaction label is initiated. After receiving the generation instruction, the application client generates an interaction label including "Little Star", as shown in FIG. 4C.

Figure 5C:
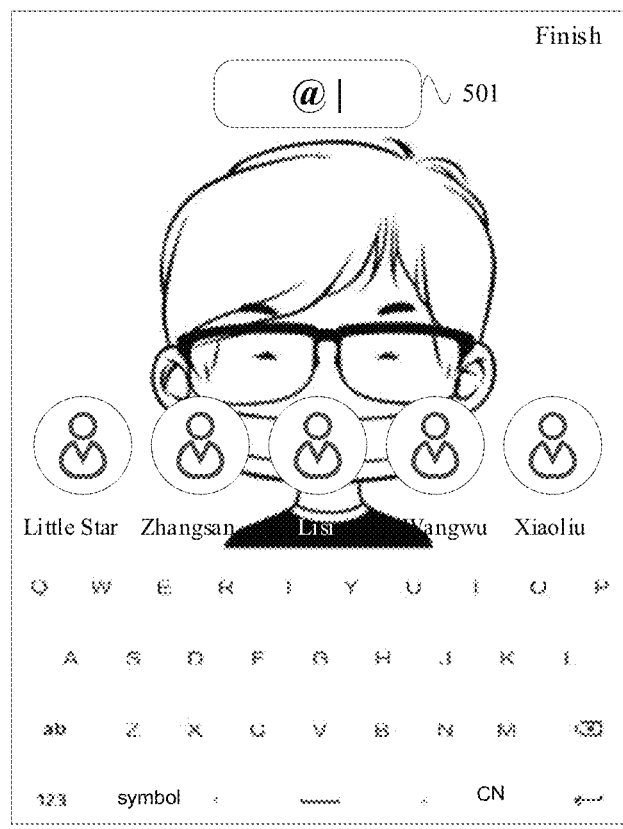

Alternatively, after the editor inputs an instruction (such as "@") of an interaction function in the first text box, a preset identification information list is displayed, as shown in FIG. 5C. In this way, the editor may directly select an interaction object without inputting identification information of the interaction object, which provides convenience for the editor.

It should be noted that the interaction object and an object corresponding to face recognition may be the same or different. For example, an object successfully recognized by face recognition in the original video file is A, and the interaction object @ by the editor may be A or B.

Moreover, the interaction label may include identification information of one interaction object, or may include identification information of multiple interaction objects, for example, the editor @ three interaction objects A, B, and C simultaneously, which may be set as needed and is not limited in the embodiments of the present disclosure.

In step S203, in a case that an editing completion instruction initiated by the editor is received, a target video file including the interaction label is generated, and the target video file is released.

Specifically, a virtual button for generating the target video file may be preset in the editing interface. When the editor clicks on the virtual button to trigger an editing completion instruction, the application client may generate a target video file including the interaction label based on the editing completion instruction, and release the target video file. For example, when the editor clicks on "Next" on a lower right corner as shown in FIG. 4C, the editing completion instruction is triggered, and the application client may generate the target video file including the interaction label based on the editing completion instruction.

After the application client generates the target video file, the target video file may be uploaded to a preset server for releasing. In this way, any user (including the editor of the target video file) may send a play request to the preset server to play the target video file, and the preset server may deliver the target video file after receiving the play request, thereby sharing the target video file.

In step S204, in a case that the play instruction for the target video file initiated by the player is received, second identification information of the player and the target video file are obtained.

Specifically, in a case that the player initiates a play instruction to play the target video file through the play interface of the application client, the application client may generate a play request based on the play instruction, and send the play request to the preset server to obtain the target video file and the second identification information of the player.

In practice, when a user uses an application client, there is corresponding identification information, which may be temporarily allocated to the user by the application client, or determined by the user himself through registration or other means. Therefore, in the embodiment of the present disclosure, when the player plays the target video file through the application client, the application client may obtain the second identification information of the player in addition to obtaining the target video file from the preset server.

In step S205, if the second identification information is the same as the first identification information, when the target video file is being played, the first identification information and the preset second prompt information of the second interaction function are displayed in the interaction label.

Specifically, if the obtained second identification information is the same as the first identification information, it means that the player is the interaction object. When the target video file is played, the target video file is played in the play interface while an interaction label is displayed in the play interface, where the interaction label includes the first identification information of the interaction object and the second prompt information of the preset second interaction function. The second interaction function may be a "comment" function, and the second prompt information may be information that prompts the interacting object to comment.

Figure 6:
FIG. 6 is a schematic diagram of a play interface when an interaction object plays a target video file according to the present disclosure.

For example, in the play interface as shown in FIG. 6, if the player recognized with the above method is the "Little Star", the target video file may be played in the play interface and an interaction label may be displayed in the play interface, where the interaction label includes the first identification information "@ Little Star" and the second prompt information "Click here to comment".

In step S206, in a case that a click instruction for the second prompt information initiated by the player is received, a preset second text box is displayed.

In a case that the player clicks on the interaction label, the click instruction is initiated, and the application client may display the preset second text box after receiving the click instruction, where the second text box is used to receive the interaction information inputted from the interaction object, and the second text box is in an editable state.

Figure 7:
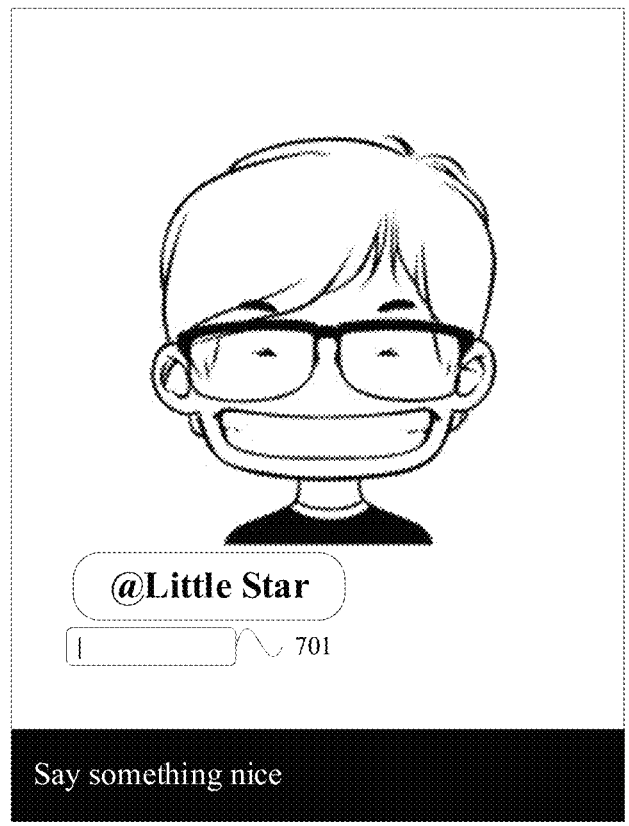
FIG. 7 is a schematic diagram of a play interface after an interaction object clicks on second prompt information according to the present disclosure.

For example, in the play interface shown in FIG. 7, after the interaction object clicks the second prompt information shown in FIG. 6, a preset second text box 701 may be displayed, and the second text box is in the editable state.

In step S207, the interaction information inputted to the second text box is received.

In a case that the second text box is displayed, the interaction object may input interaction information in the second text box. For example, the interaction object inputs interaction information "la la la la la la la la" in the second text box.

In practice, if there is no interaction information in the interaction label, the second prompt information may be displayed in the interaction label. If there is interaction information in the interaction label, the interaction information may be directly displayed.

In step S208, in a case that a confirmation instruction is received, an updated interaction label is displayed, where the updated interaction label includes the interaction information.

When the interaction object inputs interaction completion information and triggers a confirmation instruction for releasing interaction information, the application client sends the interaction information to the preset server, and the preset server updates the interaction label of the target video file based on the interaction information to obtain an updated interaction label, so as to obtain an updated target video file including the updated interaction label.

After the preset server obtains the updated target video file, any user who initiates a play request may obtain the updated target video file. When the user watches the updated target video file, he may see the updated interaction label, where the updated interaction label includes the interaction information.

In step S209, if the second identification information is different from the first identification information and is the same as third identification information of the editor, the first identification information and preset third prompt information are displayed in the interaction label when the target video file is being played.

Specifically, if the second identification information is different from the first identification information and is the same as the third identification information of the editor, it means that the player is not an interaction object, but an editor. When the target video file played, the target video file is played in the play interface while the interaction label is displayed in the play interface, where the interaction label includes the first identification information and the preset third prompt information.

Figure 8:
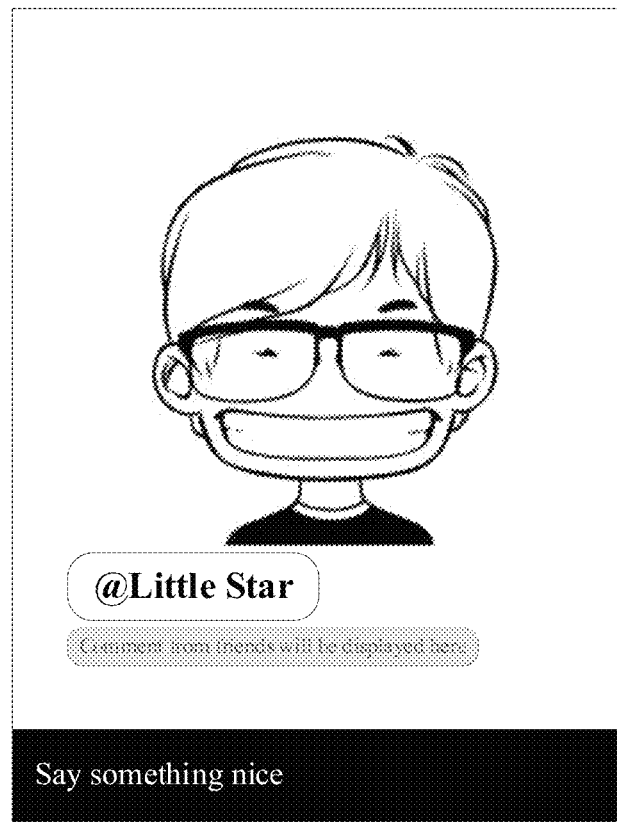
FIG. 8 is a schematic diagram of a play interface when an editor plays a target video file according to the present disclosure.

For example, in the play interface shown in FIG. 8, the player recognized through the above method is not the "Little Star" but an editor, the target video file may be played in the play interface and the interaction label may be displayed in the play interface. The interaction label includes the first identification information "@ Little Star" and the preset third prompt information "friend comments will be displayed here".

In step S2010, if the second identification information is different from both the first identification information and the third identification information of the editor, when the target video file is being played, the first identification information and a data interface for viewing information related to the first identification information are displayed in the interaction label.

Specifically, if the second identification information is different from both the first identification information and the third identification information of the editor, it means that the player is neither the interaction object nor the editor, when the target video file is played, the target video file is played in the play interface and the interaction label is displayed in the play interface simultaneously, where the interaction label includes the first identification information and a data interface for viewing information related to the first identification information, for example, a data interface for viewing a home page of the interaction object, so that the user may click the data interface to view the home page of the interaction object.

Figure 9:
FIG. 9 is a schematic diagram of a play interface when another user plays a target video file according to the present disclosure.

For example, in the play interface as shown in FIG. 9, the player recognized through the above method is neither the "Little Star" nor an editor, the target video file may be played in the play interface and the interaction label may be displayed in the play interface, where the interaction label includes the first identification information "@ Little Star" and the information "View homepage" related to the first identification information. When the player clicks "View homepage", the homepage of the "Little Star" may be displayed on the application client.

Specifically, in a case that the preset server updates the target video file and obtains the updated target video file, a play request initiated by any user to the preset server is a play request for the updated target video file. After the user initiates a play request through the application client, the updated target video file may be obtained.

It should be noted that the user does not need to distinguish whether the preset server stores the target video file or the updated target video file, and the play request only needs to include the identification information of the video file. After the preset server receives the play request, the latest video file may be obtained according to the identification information in the play request. That is, when the preset server receives the play request, if the target video file is stored in the preset server, the target video file will be delivered; if the updated target video file is stored, the updated target video file will be delivered, without the need for the user to distinguish. The embodiments of the present disclosure are only explained and described for the convenience of understanding, and are not intended to limit the scope.

After receiving the updated target video file delivered by the preset server, the application client may play the target video file in the play interface and display the updated interaction label in the play interface simultaneously.

Figure 10:
FIG. 10 is a schematic diagram of a play interface when any user plays an updated target video file according to the present disclosure.

For example, the target video file is played in the play interface as shown in FIG. 10, and the updated interaction label is displayed simultaneously. The updated interaction label includes the first identification information "@ Little Star" and the interaction information "Comment from the Little Star: la la la la la la la la la la la la."

In the embodiment of the present disclosure, in a case that a trigger instruction for the preset first interaction function is received, a preset second editing interface is displayed in the preset first editing interface for the original video file, where the second editing interface includes a preset interaction label. The first identification information of the interaction object determined by the editor is received in the interaction label, to obtain the interaction label including the first identification information. In a case that the editing completion instruction initiated by the editor is received, the target video file including the interaction label is generated and the target video file is released. In this way, when the editor edits the video file, the editor may interact with the interaction object via the interaction label in the video file. Compared with the conventional way of interacting in the comment area, the interaction experience of a user between a friend is strengthened, thereby increasing the social penetration and interaction feedback rate among friends.

Further, since the target video file includes the identification information of the interaction object, when the interaction object browses the target video file, he may directly comment in the interaction label, so that the interaction object can interact without affecting the browsing of the video file, which improves the interaction experience of the interaction object.

In addition, other users may directly view the relevant information and comment information of the interaction object when browsing the video file, without having to perform search, flip through and other operations to find the relevant information of the interaction object, thereby improving the interaction experience of other users.

In addition, the editor may also directly view the interaction information from the updated interaction label without flipping through or other operations, thereby improving the interaction experience of the editor.

Figure 11:
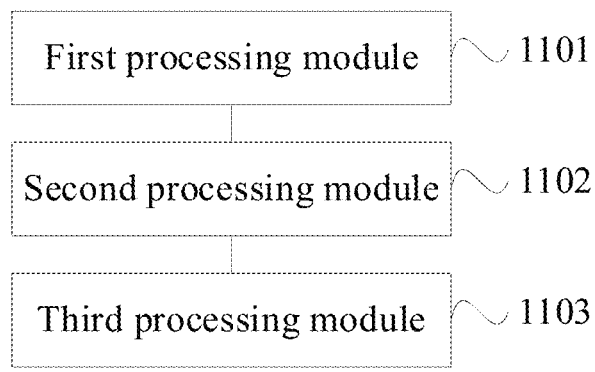
FIG. 11 is a schematic structural diagram of a video file processing apparatus according to another embodiment of the present disclosure.

FIG. 11 is a schematic structural diagram of a video file processing apparatus according to another embodiment of the present disclosure. As shown in FIG. 11, the apparatus in this embodiment may include: a first processing module 1101, a second processing module 1102, and a third processing module 1102. The first processing module 1101 is configured to display, in a preset first editing interface for an original video file, a preset second editing interface in a case that a trigger instruction for a preset first interaction function is received, where the second editing interface includes a preset interaction label. The second processing module 1102 is configured to receive, in the preset interaction label, first identification information of an interaction object determined by an editor, to obtain an interaction label including the first identification information. The third processing module 1103 is configured to generate, in a case that an editing completion instruction initiated by the editor is received, a target video file including the interaction label, and release the target video file.

In a preferred embodiment of the present disclosure, the second editing interface includes a preset identification information list, and the identification information list includes identification information of at least one interaction object. The second processing module is further configured to: receive a selection instruction for identification information in the identification information list; and generate, in a case that a generation instruction for generating an interaction label is received, an interaction label including the identification information.

In a preferred embodiment of the present disclosure, the interaction label includes a preset first text box. The second processing module is further configured to: receive identification information inputted to the first text box; and generate, in a case that a generation instruction for generating an interaction label is received, an interaction label including the identification information.

In a preferred embodiment of the present disclosure, the video file processing apparatus further includes: a fourth processing module, a fifth processing module, sixth processing module, a receiving module, and a seventh processing module. The fourth processing module is configured to obtain, in a case that a play instruction for the target video file initiated by a player is received, the target video file and second identification information of the player. The fifth processing module is configured to display, if the second identification information is the same as the first identification information, the first identification information and second prompt information of a preset second interaction function in the interaction label when the target video file is being played. The sixth processing module is configured to display a preset second text box in a case that a click instruction for the second prompt information initiated by the player is received. The receiving module is configured to receive interaction information inputted to the second text box. The seventh processing module is configured to display an updated interaction label in a case that a confirmation instruction is received, where the updated interaction label includes the interaction information.

In a preferred embodiment of the present disclosure, the video file processing apparatus further includes: an eighth processing module. The eighth processing module is configured to display, in a case that the second identification information is different from the first identification information and is the same as third identification information of the editor, the first identification information and preset third prompt information in the interaction label when the target video file is being played.

In a preferred embodiment of the present disclosure, the video file processing apparatus further includes: a ninth processing module. The ninth processing module is configured to display, in a case that the second identification information is different from both the first identification information and third identification information of the editor, the first identification information and a data interface for viewing information related to the first identification information in the interaction label when the target video file is being played.

In a preferred embodiment of the present disclosure, the trigger instruction is generated in the following way: face recognition on the original video file being performed successfully in the first editing interface; or the editor triggering a virtual button corresponding to the first interaction function in the first editing interface.

The video file processing apparatus according to this embodiment may execute the video file processing method in the first embodiment and the second embodiment of the present disclosure, and the implementation principles thereof are similar, which will not be repeated here.

In the embodiment of the present disclosure, in a case that a trigger instruction for the preset first interaction function is received, a preset second editing interface is displayed in the preset first editing interface for the original video file, where the second editing interface includes a preset interaction label. The first identification information of the interaction object determined by the editor is received in the interaction label, to obtain the interaction label including the first identification information. In a case that the editing completion instruction initiated by the editor is received, the target video file including the interaction label is generated and the target video file is released. In this way, when the editor edits the video file, the editor may interact with the interaction object via the interaction label in the video file. Compared with the conventional way of interacting in the comment area, the interaction experience of a user between a friend is strengthened, thereby increasing the social penetration and interaction feedback rate among friends.

Further, since the target video file includes the identification information of the interaction object, when the interaction object browses the target video file, he may directly comment in the interaction label, so that the interaction object can interact without affecting the browsing of the video file, which improves the interaction experience of the interaction object.

In addition, other users may directly view the relevant information and comment information of the interaction object when browsing the video file, without having to perform search, flip through and other operations to find the relevant information of the interaction object, thereby improving the interaction experience of other users.

In addition, the editor may also directly view the interaction information from the updated interaction label without flipping through or other operations, thereby improving the interaction experience of the editor.

Figure 12:
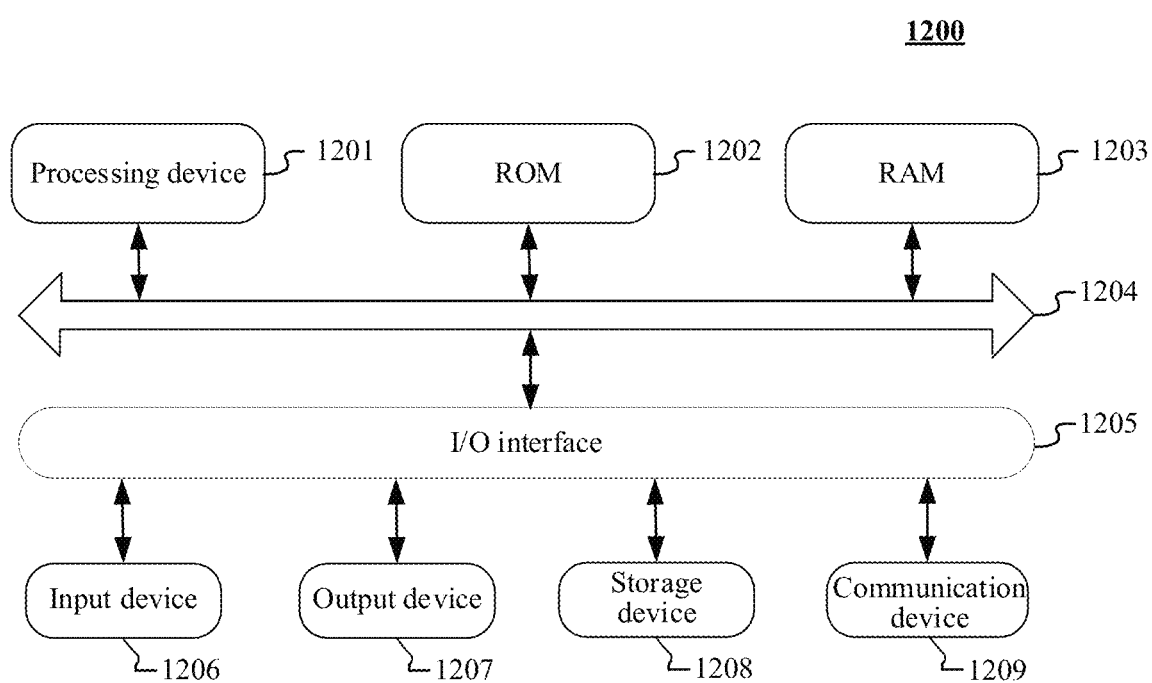
FIG. 12 is a schematic structural diagram of an electronic device for processing video files according to another embodiment of the present disclosure.

Next, referring to FIG. 12, FIG. 12 is a schematic structural diagram of an electronic device 1200 applied to implement the embodiments of the present disclosure. The electronic device in the embodiments of the present disclosure may include, but is not limited to, mobile terminals such as mobile phones, notebook computers, digital broadcast receivers, Personal Digital Assistants (PDAs), Tablets (PADs), Portable Multimedia Players (PMPs), vehicle-mounted terminals (for example, in-vehicle navigation terminals), and stationary terminals such as digital TVs, desktop computers. The electronic device shown in FIG. 12 is only an example, and should not impose any limitation on the function and usage scope of the embodiments of the present disclosure.

The electronic device 1200 may include a memory and a processor. The processor may be referred to as a processing device 1201, the memory may include at least one of read only memory (ROM) 1202, a random access memory (RAM) 1203 and a storage device 1208.

Specifically, as shown in FIG. 12, the electronic device 1200 may include a processing device 1201 (for example, a central processing unit, a graphics processor) that may perform various appropriate actions and processes based on the program stored in a read only memory (ROM) 1202 or a program loaded into a random access memory (RAM) 1203 from a storage device 1208. In the RAM 1203, various programs and data necessary for the operation of the electronic device 1200 are also stored. The processing device 1201, the ROM 1202, and the RAM 1203 are connected to each other through a bus 1204. An input/output (I/O) interface 1205 is also connected to bus 1204.

Generally, the following devices may be connected to the I/O interface 1205: an input devices 1206 including, for example, a touch screen, a touchpad, a keyboard, a mouse, a camera, a microphone, an accelerometer, a gyroscope, and the like; an output device 1207 including, for example, a liquid crystal display (LCD), a speaker, a vibrator, and the like; a storage device 1208 including, for example, a magnetic tape, a hard disk, and the like; and a communication device 1209. The communication device 1209 may allow the electronic device 1200 to communicate wirelessly or by wire with other devices to exchange data. While FIG. 12 shows the electronic device 1200 having various means, it should be understood that not all of the illustrated means are required to be implemented or provided. Alternatively, more or fewer devices may be implemented or provided.

In particular, according to the embodiments of the present disclosure, the processes described above with reference to the flowcharts may be implemented as computer software programs. For example, a computer program product is provided according to an embodiment of the present disclosure, which includes a computer program carried on a non-transitory computer readable medium, the computer program contains program codes for performing the method illustrated in the flowchart. In such an embodiment, the computer program may be downloaded from the network via the communication device 1209, or installed from the storage device 1208 or the ROM 1202. When the computer program is executed by the processing device 1201, the above-mentioned functions defined in the method according to the embodiments of the present disclosure are implemented.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage medium may include, but are not limited to, electrical connections with one or more wires, portable computer disks, hard disks, random access memory (RAM), read only memory (ROM), erasable Programmable read only memory (EPROM or flash memory), optical fiber, portable compact disk read only memory (CD-ROM), optical storage devices, magnetic storage devices, or any suitable combination thereof. In this present disclosure, a computer-readable storage medium may be any tangible medium that contains or stores a program that can be used by or in conjunction with an instruction execution system, apparatus, or device. In the present disclosure, the computer-readable signal medium may include a data signal propagated in baseband or as part of a carrier wave with computer-readable program code embodied thereon. Such propagated data signal may take a variety of forms, including but not limited to electromagnetic signals, optical signals, or any suitable combination thereof. The computer-readable signal medium may also be any computer-readable medium other than the computer-readable storage medium, and can transmit, propagate, or transport the program for use by or in connection with the instruction execution system, apparatus, or device. Program codes embodied on a computer readable medium may be transmitted using any suitable medium including, but not limited to, electrical wire, optical fiber cable, RF (radio frequency), and the like, or any suitable combination thereof.

In some embodiments, the client or server may communicate using any currently known or future developed network protocol, such as HyperText Transfer Protocol (HTTP), and may interconnect with digital data communication (for example, communication network) in any form or medium. Examples of communication networks include local area networks (LAN), wide area networks (WAN), the network (for example, the Internet), and peer-to-peer networks (for example, ad hoc peer-to-peer networks), as well as any currently known or future development networks.

The above-mentioned computer-readable medium may be included in the above-mentioned electronic device, or may exist alone without being assembled into the electronic device.

The above-mentioned computer-readable medium carries one or more programs, and the one or more programs, when executed by the electronic device, cause the electronic device to perform steps of: displaying, in a case that a trigger instruction for a preset first interaction function is received, a preset second editing interface in a preset first editing interface for an original video file, where the second editing interface includes a preset interaction label; receiving, in the preset interaction label, first identification information of an interaction object determined by an editor, to obtain an interaction label including the first identification information; and generating, in a case that an editing completion instruction initiated by the editor is received, a target video file including the interaction label, and releasing the target video file.

Computer program codes for performing operations of the present disclosure may be written in one or more programming languages, including but not limited to object-oriented programming languages, such as Java, Smalltalk, C++, and conventional procedural programming languages, such as the "C" language or similar programming languages. The program codes may be executed entirely or partly on a computer of a user, executed as a stand-alone software package, executed partly on the computer of the user and partly on a remote computer, or entirely on the remote computer or server. In the case of a remote computer, the remote computer may be connected to the computer of the user through any kind of network, including a local area network (LAN) or a wide area network (WAN), or may be connected to an external computer (for example, via an Internet connection provided by an Internet service provider).

The flowchart and block diagrams in the drawings illustrate the architecture, functionality, and operation of possible implementations of systems, methods and computer program products according to the embodiments of the present disclosure. In this regard, each block in the flowchart or block diagrams may represent a module, a segment, or a portion of code that contains executable instructions for implementing the specified logical functions. It should also be noted that, in some alternative implementations, the functions noted in the blocks may be executed out of the order noted in the figures. For example, two blocks shown in succession may, in fact, be executed substantially concurrently, or may be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or may be implemented in a combination of dedicated hardware and computer instructions.

The modules or units involved in the embodiments of the present disclosure may be implemented in software or hardware. The name of the module or unit does not constitute a limitation of the module or unit itself under certain circumstances.

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. the machine-readable medium may include, but is not limited to, electronic, magnetic, optical, electromagnetic, infrared, or semiconductor systems, apparatuses, or devices, or any suitable combination thereof. More specific examples of machine-readable storage medium may include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, in an example one, a video file processing method is provided, which includes:

displaying, in a case that a trigger instruction for a preset first interaction function is received, a preset second editing interface in a preset first editing interface for an original video file, where the second editing interface includes a preset interaction label;

receiving, in the preset interaction label, first identification information of an interaction object determined by an editor, to obtain an interaction label including the first identification information; and generating, in a case that an editing completion instruction initiated by the editor is received, a target video file including the interaction label, and releasing the target video file.

In a preferred embodiment of the present disclosure, the second editing interface includes a preset identification information list, and the identification information list includes identification information of at least one interaction object. The receiving, in the preset interaction label, first identification information of an interaction object determined by the editor, to obtain an interaction label including the first identification information includes:

receiving a selection instruction for identification information in the identification information list; and generating, in a case that a generation instruction for generating an interaction label is received, an interaction label including the identification information.

In a preferred embodiment of the present disclosure, the interaction label includes a preset first text box. The receiving, in the preset interaction label, first identification information of an interaction object determined by the editor, to obtain an interaction label including the first identification information includes:

receiving identification information inputted to the first text box; and generating, in a case that a generation instruction for generating an interaction label is received, an interaction label including the identification information.

In a preferred embodiment of the present disclosure, the method further includes:

obtaining, in a case that a play instruction for the target video file initiated by a player is received, the target video file and second identification information of the player;

displaying, if the second identification information is the same as the first identification information, the first identification information and second prompt information of a preset second interaction function in the interaction label when the target video file is being played;

displaying a preset second text box in a case that a click instruction for the second prompt information initiated by the player is received;

receiving interaction information inputted to the preset second text box; and displaying an updated interaction label in a case that a confirmation instruction is received, where the updated interaction label includes the interaction information.

In a preferred embodiment of the present disclosure, the method further includes:

displaying, in a case that the second identification information is different from the first identification information and is the same as third identification information of the editor, the first identification information and preset third prompt information in the interaction label when the target video file is being played.

In a preferred embodiment of the present disclosure, the method further includes:

displaying, in a case that the second identification information is different from both the first identification information and third identification information of the editor, the first identification information and a data interface for viewing information related to the first identification information in the interaction label when the target video file is being played.

In a preferred embodiment of the present disclosure, the trigger instruction is generated in the following way:

face recognition on the original video file being performed successfully in the first editing interface; or the editor triggering a virtual button corresponding to the first interaction function in the first editing interface.

According to one or more embodiments of the present disclosure, in an example two, an apparatus for implementing the example one is provided, which includes: a first processing module, a second processing module, and a third processing module. The first processing module is configured to display, in a preset first editing interface for an original video file, a preset second editing interface in a case that a trigger instruction for a preset first interaction function is received, where the second editing interface includes a preset interaction label. The second processing module is configured to receive, in the preset interaction label, first identification information of an interaction object determined by an editor, to obtain an interaction label including the first identification information. The third processing module is configured to generate, in a case that an editing completion instruction initiated by the editor is received, a target video file including the interaction label, and release the target video file.

In a preferred embodiment of the present disclosure, the second editing interface includes a preset identification information list, and the identification information list includes identification information of at least one interaction object. The second processing module is further configured to: receive a selection instruction for identification information in the identification information list; and generate, in a case that a generation instruction for generating an interaction label is received, an interaction label including the identification information.

In a preferred embodiment of the present disclosure, the interaction label includes a preset first text box. The second processing module is further configured to: receive identification information inputted to the first text box; and generate, in a case that a generation instruction for generating an interaction label is received, an interaction label including the identification information.

In a preferred embodiment of the present disclosure, the apparatus further includes: a fourth processing module, a fifth processing module, sixth processing module, a receiving module, and a seventh processing module. The fourth processing module is configured to obtain, in a case that a play instruction for the target video file initiated by a player is received, the target video file and second identification information of the player. The fifth processing module is configured to display, if the second identification information is the same as the first identification information, the first identification information and second prompt information of a preset second interaction function in the interaction label when the target video file is being played. The sixth processing module is configured to display a preset second text box in a case that a click instruction for the second prompt information initiated by the player is received. The receiving module is configured to receive interaction information inputted to the second text box. The seventh processing module is configured to display an updated interaction label in a case that a confirmation instruction is received, where the updated interaction label includes the interaction information.

In a preferred embodiment of the present disclosure, the apparatus further includes: an eighth processing module. The eighth processing module is configured to display, in a case that the second identification information is different from the first identification information and is the same as third identification information of the editor, the first identification information and preset third prompt information in the interaction label when the target video file is being played.

In a preferred embodiment of the present disclosure, the apparatus further includes: a ninth processing module. The ninth processing module is configured to display, in a case that the second identification information is different from both the first identification information and third identification information of the editor, the first identification information and a data interface for viewing information related to the first identification information in the interaction label when the target video file is being played.

In a preferred embodiment of the present disclosure, the trigger instruction is generated in the following way: face recognition on the original video file being performed successfully in the first editing interface; or the editor triggering a virtual button corresponding to the first interaction function in the first editing interface.

The above description merely illustrates the embodiments of the present disclosure and the technical principles employed. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the present disclosure (but not limited to) with similar functions.

Additionally, although operations are described in a particular order, this should not be construed that the operations are performed in the particular order shown or in a sequential order. Under certain circumstances, multitasking and parallel processing may be advantageous. Although several implementation-specific details are described above, these should not be construed as limitations on the scope of the present disclosure. Certain features that are described in the context of a single embodiment may also be applied in a single embodiment. Conversely, features that are described in the context of a single embodiment may also be applied in multiple embodiments separately or in any suitable sub combination.

Although the subject matter has been described in language specific to structural features and/or method logical acts, it is to be understood that the subject matter defined in the claims is not necessarily limited to the specific features or acts described above. Rather, the specific features and acts described above are merely example forms of implementing the claims.

The invention claimed is:

1. A video file processing method, comprising:
   in response to receiving a play instruction for a target video file initiated by a player, obtaining the target video file and second identification information of the player, wherein the target video file is generated in response to receiving an editing completion instruction from an editor via an editing interface, and the target video file comprises an interaction label comprising first identification information of an interaction object determined by the editor;
   in response to determining that the second identification information is the same as the first identification information, displaying the first identification information and second prompt information of a preset second interaction function in the interaction label on a video playing interface when the target video file is being played on the video playing interface, wherein the second prompt information of the preset second interaction function is configured to prompt the player to perform an interaction action corresponding to the preset second interaction function;
   displaying a preset text box on the video playing interface in response to receiving a click instruction for the second prompt information initiated by the player on the video playing interface;
   receiving interaction information inputted to the preset text box on the video playing interface;
   displaying an updated interaction label in response to receiving a confirmation instruction, wherein the updated interaction label comprises the interaction information;
   wherein the video file processing method further comprises:
   in response to determining that the second identification information is different from the first identification information and that the second identification information is the same as third identification information of the editor, displaying the first identification information and preset third prompt information indicative of a comment to be displayed in the interaction label on the video playing interface when the target video file is being played; and
   in response to determining that the second identification information is different from both the first identification information and third identification information of the editor, displaying the first identification information and a data interface for viewing a home page of the interaction object identified by the first identification information in the interaction label on the video playing interface when the target video file is being played.

2. The video file processing method according to claim 1, wherein the editing interface comprises a preset identification information list, and the preset identification information list comprises identification information of at least one interaction object; and wherein the interaction label comprising the first identification information is generated based on receiving a selection instruction for the first identification information in the identification information list.

3. The video file processing method according to claim 1, wherein the editing interface is displayed in response to receiving a trigger instruction for a preset first interaction function, and wherein the trigger instruction is generated based on:
   face recognition on an original video file being performed successfully, wherein the target video file is generated based on editing the original video; or
   the editor triggering a virtual button corresponding to the preset first interaction function.

4. A video file processing apparatus, comprising:
   at least one processor; and
   at least one memory communicatively coupled to the at least one processor and storing instructions that upon execution by the at least one processor cause the apparatus to:
   in response to receiving a play instruction for a target video file initiated by a player, obtain the target video file and second identification information of the player, wherein the target video file is generated in response to receiving an editing completion instruction from an editor via an editing interface, and the target video file comprises an interaction label comprising first identification information of an interaction object determined by the editor;
   in response to determining that the second identification information is the same as the first identification information, display the first identification information and second prompt information of a preset second interaction function in the interaction label on a video playing interface when the target video file is being played on the video playing interface, wherein the second prompt information of the preset second interaction function is configured to prompt the player to perform an interaction action corresponding to the preset second interaction function;
   display a preset text box on the video playing interface in response to receiving a click instruction for the second prompt information initiated by the player on the video playing interface;
   receive interaction information inputted to the preset text box on the video playing interface;
   display an updated interaction label in response to receiving a confirmation instruction, wherein the updated interaction label comprises the interaction information;
   wherein the at least one memory further stores instructions that upon execution by the at least one processor cause the apparatus to:
   in response to determining that the second identification information is different from the first identification information and that the second identification information is the same as third identification information of the editor, display the first identification information and preset third prompt information indicative of a comment to be displayed in the interaction label on the video playing interface when the target video file is being played; and
   in response to determining that the second identification information is different from both the first identification information and third identification information of the editor, display the first identification information and a data interface for viewing a home page of the interaction object identified by the first identification information in the interaction label on the video playing interface when the target video file is being played.

5. The apparatus of claim 4,
   wherein the editing interface comprises a preset identification information list, and the preset identification information list comprises identification information of at least one interaction object; and
   wherein the interaction label comprising the first identification information is generated based on receiving a selection instruction for the first identification information from of one interaction object in the identification information list.

6. The apparatus of claim 4, wherein the editing interface is displayed in response to receiving a trigger instruction for a preset first interaction function, and wherein the trigger instruction is generated based on:
   face recognition on an original video file being performed successfully, wherein the target video file is generated based on editing the original video; or
   the editor triggering a virtual button corresponding to the preset first interaction function.

7. A non-transitory computer-readable storage medium, storing computer instructions, which, when executed on a computer, enable the computer to:
   in response to receiving a play instruction for a target video file initiated by a player, obtain the target video file and second identification information of the player, wherein the target video file is generated in response to receiving an editing completion instruction from an editor via an editing interface, and the target video file comprises an interaction label comprising first identification information of an interaction object determined by the editor;
   in response to determining that the second identification information is the same as the first identification information, display the first identification information and second prompt information of a preset second interaction function in the interaction label on a video playing interface when the target video file is being played on the video playing interface, wherein the second prompt information of the preset second interaction function is configured to prompt the player to perform an interaction action corresponding to the preset second interaction function;
   display a preset text box on the video playing interface in response to receiving a click instruction for the second prompt information initiated by the player on the video playing interface;
   receive interaction information inputted to the preset text box on the video playing interface;
   display an updated interaction label in response to receiving a confirmation instruction, wherein the updated interaction label comprises the interaction information;
   wherein the non-transitory computer-readable storage medium further stores computer instructions that upon execution by the computer cause the computer to perform operations comprising:
   in response to determining that the second identification information is different from the first identification information and that the second identification information is the same as third identification information of the editor, display the first identification information and preset third prompt information indicative of a comment to be displayed in the interaction label on the video playing interface when the target video file is being played; and in response to determining that the second identification information is different from both the first identification information and third identification information of the editor, display the first identification information and a data interface for viewing a home page of the interaction object identified by the first identification information in the interaction label on the video playing interface when the target video file is being played.

* * * * *